UNITED STATES PATENT OFFICE 2,649,455 a,a-DIPHENYL-γ-(1-METHYL-2-PIPERIDYL)-BUTYRONITRILE

Lewis A. Walter, Madison, Richard H. Barry, Bloomfield, and John R. Clark, Nutley, N. J., assignors to Maltbie Laboratories, Inc., Newark, N. J., a corporation of New Jersey No Drawing. Application March 22, 1951, Serial No. 217,056

1 Claim. (Cl. 260—293)

This invention relates to a new and useful composition of matter, a,a-diphenyl-γ-(1-methyl-2-piperidyl)-butyronitrile having the formula:

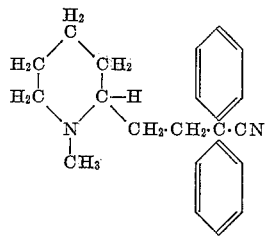

which is valuable as a pharmaceutical particularly as an antispasmodic of the atropine type. It is also useful as an intermediate in the preparation of other compounds which are useful as pharmaceuticals as antispasmodics, by conversion of the nitrile group (—CN) to amide, carboxyl, alkoxyl, urethane, keto, and amino methyl groups. The compound of the present invention may also be used in the formation of quaternary salts such as the metho-bromide, etho-sulfate, and others as will occur to those skilled in the art, by changing the nitrogen atom of the ring to a valence of five.

Two methods of preparation of the compound of the present invention are set forth in the following examples:

Example I

Ten grams of sodium was dissolved in three liters of dry isopropanol and 386 g. of diphenyl acetonitrile and 210 g. of 2-vinylpyridine was added. The mixture was refluxed for five hours, then diluted with an equal volume of warm water. On chilling a,a-diphenyl-γ-2(pyridyl)-butyronitrile crystallized out and was filtered off and recrystallized from methanol to give the pure nitrile, M. P. 120–122° C. The reaction taking place may be expressed as follows:

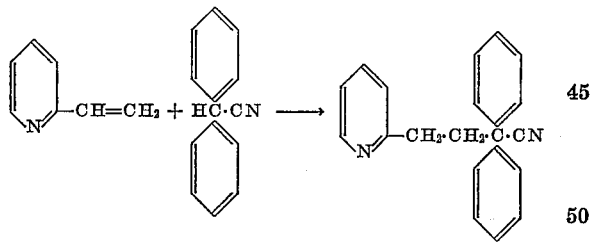

Three hundred grams of this nitrile was dissolved in three liters of dry benzene and gently refluxed with 135 g. of methyl sulfate for twenty-four hours. An almost quantitative yield of methylsulfate salt precipitated and was filtered off. It melted at 163–165° C. and was usually pure enough for subsequent hydrogenation, but was crystallized from ethanol when necessary. This reaction may be expressed as follows:

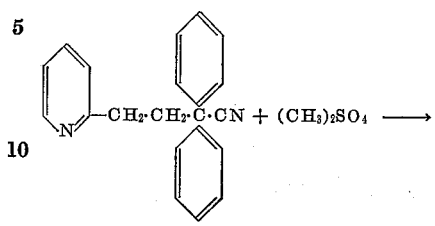

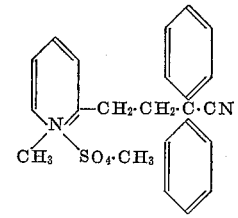

The above salt in 1600 ml. of methanol was hydrogenated with hydrogen at 100 atmospheres pressure using 15 g. of Raney nickel catalyst at a temperature preferably below 85° C. The catalyst and solvent was removed in the usual manner and the resulting syrup was dissolved in water and made quite strongly alkaline with sodium hydroxide. The oil which separated was the desired product. It was best purified as the perchlorate salt M. P. 162–164° C. from methanol. The hydrochloride was hygroscopic, but the hydrobromide crystallized with one molecule of isopropyl acetate of crystallization, M. P. 76–78° C. A crystalline tartrate was also obtained. The reaction occurring was as follows:

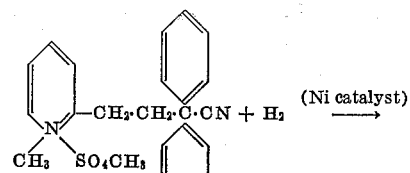

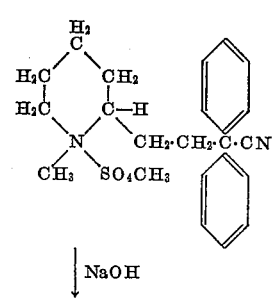

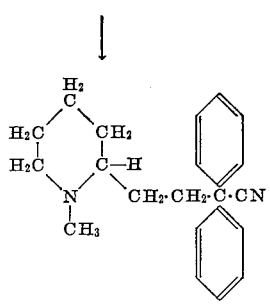

Example II

β-(N-methyl-2-piperidyl) ethanol was reacted with thionyl chloride in the usual manner to give the chloride hydrochloride, M. P. 134–137° C. according to the equation:

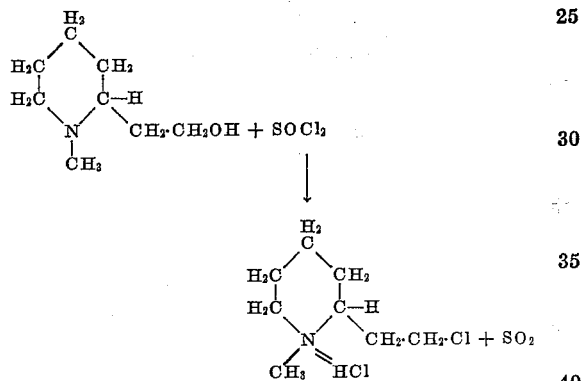

A cold solution of fifty grams of this salt in water was treated with an excess of cold sodium hydroxide solution and the free base was extracted with toluene. This toluene solution was dried over potassium carbonate, filtered, and added to a suspension of 54 g. of sodio-diphenyl acetonitrile (prepared from sodamide in the usual manner in toluene). The mixture was stirred and heated at 100° C. for three hours, then cooled, washed with water, and the toluene layer was separated and the solvent removed. The residue of crude α,α-diphenyl-γ-(1-methyl-2-piperidyl)-butyronitrile was purified as the perchlorate salt.

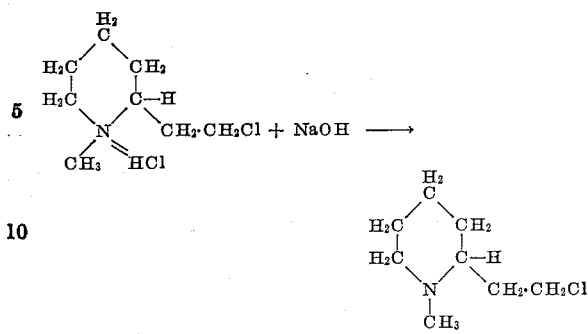

What is claimed is:

α,α-Diphenyl-γ-(1-methyl-2 - piperidyl) - butyronitrile having the formula:

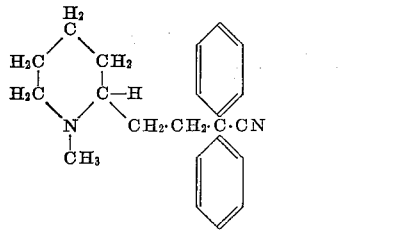

LEWIS A. WALTER.
RICHARD H. BARRY.
JOHN R. CLARK.

References Cited in the file of this patent

UNITED STATES PATENTS

| Number | Name | Date |
|---|---|---|
| 2,230,774 | Bockmuhl et al. | Feb. 4, 1941 |